(12) United States Patent
Uno

(10) Patent No.: US 10,964,065 B2
(45) Date of Patent: Mar. 30, 2021

(54) IMAGE EVALUATION APPARATUS THAT EVALUATES IMAGE POSTED TO NETWORKING SERVICE, SYSTEM, CONTROL METHOD FOR IMAGE EVALUATION APPARATUS, AND STORAGE MEDIUM

(71) Applicant: CANON KABUSHIKI KAISHA, Tokyo (JP)

(72) Inventor: Yurie Uno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 16/502,293

(22) Filed: Jul. 3, 2019

(65) Prior Publication Data
US 2020/0013193 A1  Jan. 9, 2020

(30) Foreign Application Priority Data
Jul. 6, 2018 (JP) .............................. JP2018-129176

(51) Int. Cl.
*G06T 7/00* (2017.01)
*G06F 16/58* (2019.01)
*G06F 16/583* (2019.01)
*G06Q 50/00* (2012.01)

(52) U.S. Cl.
CPC .............. *G06T 7/97* (2017.01); *G06F 16/583* (2019.01); *G06F 16/5866* (2019.01); *G06Q 50/01* (2013.01)

(58) Field of Classification Search
CPC ..... G06T 7/97; G06F 16/5866; G06F 16/583; G06Q 50/01
See application file for complete search history.

(56) References Cited

U.S. PATENT DOCUMENTS

| 2013/0036169 A1* | 2/2013 | Quigley ................. G06Q 50/01 709/204 |
| 2014/0146052 A1* | 5/2014 | Takamura ............... G06F 13/00 345/440 |

(Continued)

FOREIGN PATENT DOCUMENTS

JP   2015-220616 A   12/2015

*Primary Examiner* — Carol Wang
(74) *Attorney, Agent, or Firm* — Cowan, Liebowitz & Latman, P.C.

(57) ABSTRACT

An image evaluation apparatus which is capable of evaluating an image that can be given positive evaluations in a networking service. Images included in post data posted on a networking service and evaluating values for the post data are obtained at predetermined time intervals. When the post data has been obtained, first parameters are generated by applying an image analysis process to the images. The first parameters and the evaluation values are stored in association with each other. Upon input of image to be evaluated, a second parameter is generated by applying the image analysis process to the image to be evaluated. A first parameter corresponding to the second parameter is extracted from the plurality of stored first parameters. Parameter evaluation values representing variations in the evaluation values associated with the extracted first parameter in notifying order are calculated. Notification of the calculated parameter evaluation values is provided.

14 Claims, 7 Drawing Sheets

(56) References Cited

U.S. PATENT DOCUMENTS

2015/0058079 A1\* 2/2015 Freund ................... G06Q 50/01
705/7.31
2015/0169587 A1\* 6/2015 Silverman .......... G06Q 30/0201
707/751
2018/0330389 A1\* 11/2018 Hwang .............. G06K 9/00677

\* cited by examiner

FIG. 3A

301
SNS TABLE

| SNS NAME | OBTAINMENT TARGET | OBTAINMENT TIME | DATE AND TIME OF LAST OBTAINMENT |
|---|---|---|---|
| SNSA | Yes | EVERY DAY | 2018/4/4 |
| SNSB | Yes | EVERY WEEK | 2018/4/3 |
| SNSC | No | NONE | NONE |

401
ANALYSIS PROCESS TABLE

| ANALYSIS PROCESS | SNS NAME |
|---|---|
| SUBJECT ANALYSIS | SNSA |
| SUBJECT ANALYSIS | SNSB |
| COMPOSITION ANALYSIS | SNSB |

501
POST DATA TABLE

| POSTED IMAGE | DATE AND TIME OF POSTING | IMAGE EVALUATION | POSTING USER | SUBJECT INFORMATION |
|---|---|---|---|---|
| IMAGE1 | 2018/4/3 | 3 | USER1 | DOG |
| IMAGE2 | 2017/10/6 | 2 | USER2 | CAR |
| IMAGE3 | 2015/6/15 | 5 | USER1 | CAT |

601
EXTRACTING CONDITION TABLE

| TIME PERIOD | TARGET USER |
|---|---|
| FROM ONE YEAR AGO TILL NOW | ALL USERS |
| FROM ONE MONTH AGO TILL NOW | USERS WHO ARE FOLLOWED |
| FROM TEN YEARS AGO TO FIVE YEARS AGO | CAT INFLUENCER |

701
CALCULATION TABLE

| CALCULATION TIME | CALCULATION METHOD |
|---|---|
| EVERY MONTH | AVERAGE |
| EVERY DAY | RATE OF INCREASE |
| EVERY YEAR | AVERAGE |

801
PARAMETER EVALUATION VALUE MATRIX
SUBJECT

| EVALUATION | 2017/12/5 | 2018/1/5 | 2018/2/5 | 2018/3/5 | 2018/4/5 |
|---|---|---|---|---|---|
| DOG | 3 | 4 | 5 | 5 | 4 |
| CAR | 5 | 4 | 3 | 3 | 3 |

802, 803, 804, 805

IMAGE EVALUATION APPARATUS THAT EVALUATES IMAGE POSTED TO NETWORKING SERVICE, SYSTEM, CONTROL METHOD FOR IMAGE EVALUATION APPARATUS, AND STORAGE MEDIUM

BACKGROUND OF THE INVENTION

Field of the Invention

The present invention relates to an image evaluation apparatus that evaluates an image that is to be posted on a networking service, a system, a control method for the image evaluation apparatus, and a storage medium.

Description of the Related Art

Recently, social networking services (hereafter referred to as SNSs) are used. The SNSs are used by not only individuals but also companies. People who use an SNS (hereafter referred to as users) can post images on the SNS by using predetermined terminals. The images posted to the SNS can be viewed by a plurality of users who use the SNS. Each user can give a positive evaluation or a negative evaluation to a post image. As an example of related, a technology for posting a captured image to an appropriate SNS has been proposed (see Japanese Laid-Open Patent Publication (Kokai) No. 2015-220616). According to this technology, an electronic apparatus selects an SNS, out of several SNSs, to which a captured image is posted based on a shooting scene for the captured image, a posture of a camera during shooting, and so forth.

Images that can receive positive evaluation in networking services such as an SNS tend to be influenced by trends that changes over time. Therefore, when a user posts an image with an aim of receiving positive evaluation in a networking service, he or she visually checks what kind of images are now receiving positive evaluation in the networking service. Then, based on the checking results, the user selects an image that is posted to the networking service. Many images are posted on the networking service, and evaluations for the images change as time passes. Thus, selecting an image that will receive positive evaluation through visual checking is a burden on the user. According to the technology described in Japanese Laid-Open Patent Publication (Kokai) No. 2015-220616, an SNS on which an image will be posted is selected based on a shooting scene for a captured image, a posture of a camera during shooting, and so forth. This technology, however, does not aim to select an image that will receive positive evaluation in a networking service and hence does not reduce the burden on the user when selecting an image.

SUMMARY OF THE INVENTION

The present invention provides an image evaluation apparatus, a system, and an image evaluation method which are capable of evaluating an image that can be given positive evaluation in a networking service, as well as a storage medium.

Accordingly, the present invention provides an image evaluation apparatus including an obtaining unit configured to obtain images included in post data posted on a networking service and evaluation values for the post data at predetermined time intervals, a first image analysis unit configured to, upon obtaining the post data, generate first parameters by applying an image analysis process to the image, a control unit configured to store the generated first parameters and the evaluation values in association with each other in a storage unit, a second image analysis unit configured to, upon receiving input of an image to be evaluated, generate a second parameter by applying the image analysis process applied by the first image analysis unit to the image to be evaluated, an extraction unit configured to extract a first parameter corresponding to the second parameter from the plurality of first parameters stored in the storage unit, a calculation unit configured to calculate parameter evaluation values representing variations in the evaluation values associated with the extracted first parameter in chronological order and a notification unit configured to notify the calculated parameter evaluation values.

An image evaluation apparatus, a system, and an image evaluation method according to the present invention are capable of evaluating an image that can be given positive evaluation in a networking service.

Further features of the present invention will become apparent from the following description of exemplary embodiments (with reference to the attached drawings).

BRIEF DESCRIPTION OF THE DRAWINGS

FIG. 3A is a view showing an example of an SNS table, and FIG. 3B is a view showing an example of an analysis process table.

FIG. 4A is a view showing an example of a post data table, and FIG. 4B is a view showing an example of an extracting condition table.

FIG. 5A is a view showing an example of a calculation table, and FIG. 5B is a view showing an example of a parameter evaluation value matrix.

DESCRIPTION OF THE EMBODIMENTS

An embodiment of the present invention will now be described with reference to the drawings.

Figure 1:
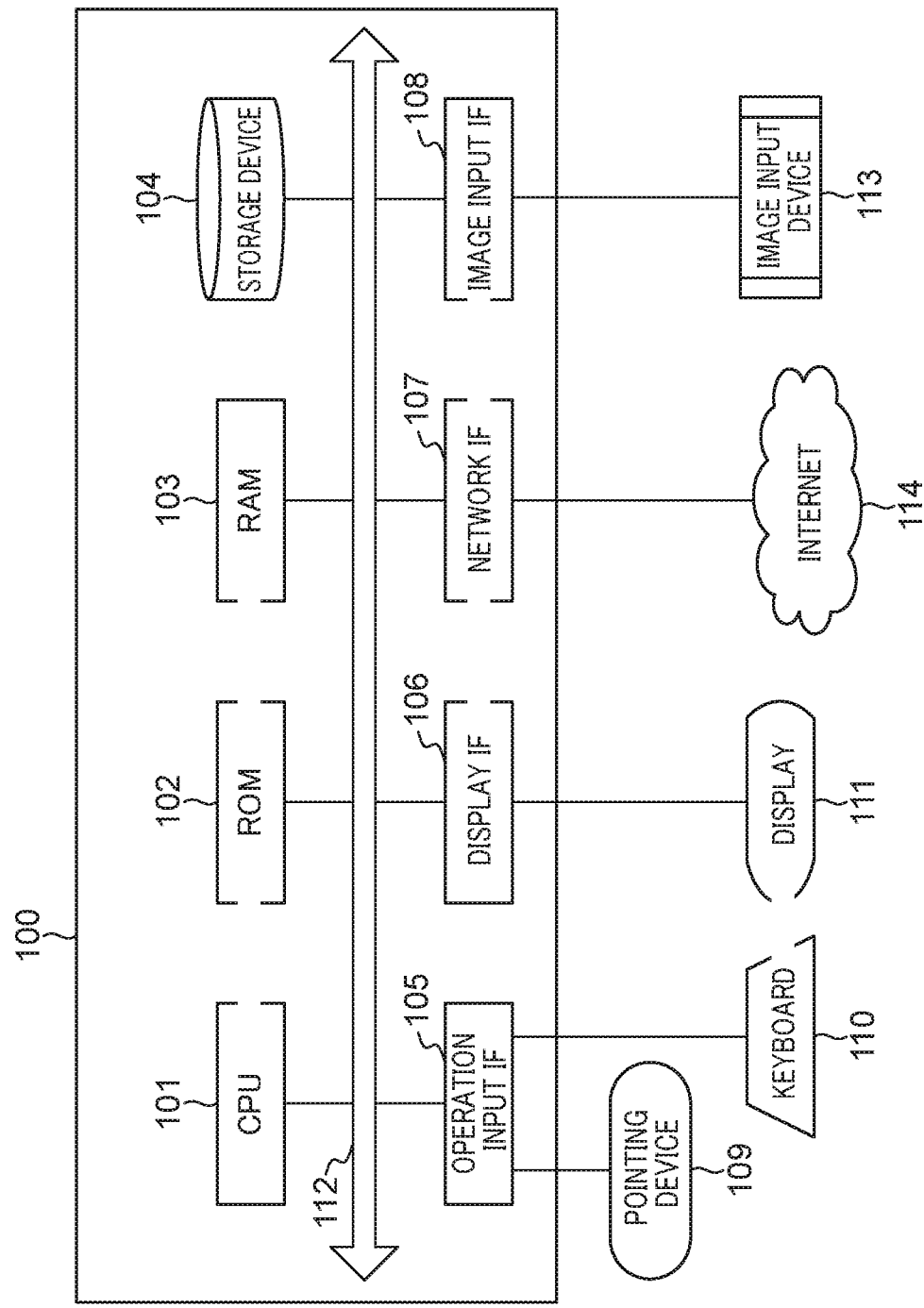
FIG. 1 is a diagram showing an arrangement of an image evaluation apparatus according to an embodiment.

FIG. 1 is a diagram showing an arrangement of an image evaluation apparatus 100 according to an embodiment. The image evaluation apparatus 100 can be implemented either by a single computer apparatus or by a plurality of computer apparatuses to which functions of the image evaluation apparatus 100 are distributed. In the case where the image evaluation apparatus 100 is implemented by a plurality of computer apparatuses, the computer apparatuses are connected to one another via a local area network (LAN), the Internet, or the like so that they can communicate with one another. Referring to FIG. 1, the image evaluation apparatus 100 has a central processing unit (CPU) 101, a read-only memory (ROM) 102, and a random-access memory (RAM) 103. The image evaluation apparatus 100 also has a storage device 104, an operation input interface 105, a display interface 106, a network interface 107, and an image input interface 108. In the drawings, the interfaces are represented as "IF". The component elements are connected to one another by a system bus 112. The operation input interface 105 is connected to a pointing device 109 and a keyboard 110. The display interface 106 is connected to a display 111. The network interface 107 is connected to the Internet 114. The image input interface 108 is connected to an image input device 113.

The CPU 101 controls the entire image evaluation apparatus 100. The ROM 102 stores programs and parameters that need not be changed. The RAM 103 temporarily stores programs and data supplied from the storage device 104, the Internet 114, and so forth. The storage device 104 is a hard disk or a memory card fixedly installed in the image evaluation apparatus 100, an optical disk removable from the image evaluation apparatus 100, a magnetic card, an optical card, an IC card, or the like. The operation input interface 105 receives input operations on the pointing device 109 and the keyboard 110. The display interface 106 is an interface that is connected to the display 111 (display device) for displaying, for example, data held by the image evaluation apparatus 100. The network interface 107 is an interface for connecting to a network circuit such as the Internet 114 or the like. The image input interface 108 is an interface which is connected to an image input device 113. Processes in the embodiment are implemented by the CPU 101 of the image evaluation apparatus 100 reading out and executing programs supplied from the ROM 102, the RAM 103, the storage device 104, the Internet 114, and so forth. By executing the programs, the CPU 101 act as an obtaining unit, a first image analysis unit, a control unit, a second image analysis unit, an extraction unit, a calculation unit, a notification unit, and a posting unit.

Figure 2:
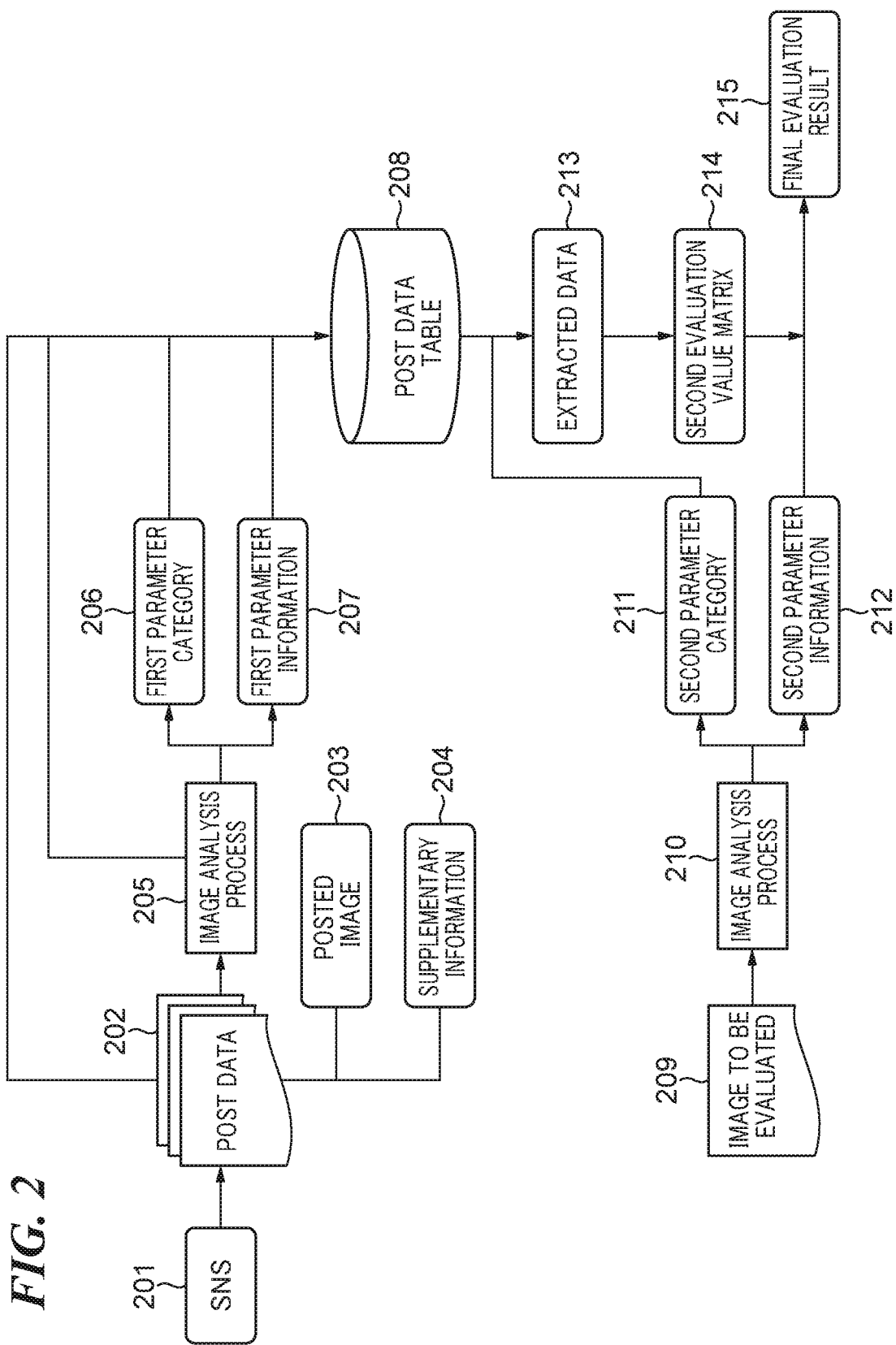
FIG. 2 is a diagram showing flows of data and processing according to the embodiment.

FIG. 2 is a diagram showing flows of data and processing according to the embodiment. The CPU 101 obtains post data 202 from an SNS 201 in accordance with conditions registered in an SNS table 301. The image evaluation apparatus 100 is connected to the Internet 114 via the network interface 107. On the Internet 114, SNSs (social networking services) are managed networking services with, for example, servers. There is a plurality of SNSs on the Internet 114, and each of the SNSs is shared by a plurality of users. Users who use each SNS can post posting data including image data to the SNS using a terminal which he or she operates (such as a personal computer or a smartphone). The terminal the user uses when posting the posting data to the SNS may be either the image evaluation apparatus 100 or the image input device 113. The image evaluation apparatus 100 may obtain the post data 202 from either one SNS 201 or a plurality of SNSs 201. In the following description, it is assumed that the image evaluation apparatus 100 obtains the post data 202 from the plurality of SNSs 201.

FIG. 3A is a view showing an example of the SNS table 301. The SNS table 301 has columns of SNS name 302, obtainment target 303, obtainment time 304, and date and time of last obtainment 305. The SNS name 302 is name for identifying respective SNSs evaluation target by the image evaluation apparatus 100. The obtainment target 303 indicates whether respective ones of the SNSs are currently evaluation target. The obtainment time 304 represents timing when the post data 202 is to be obtained from the SNSs targeted for obtainment and correspond to predetermined time intervals. The date and time of last obtainment 305 represents timing (dates and times) when the post data 202 was obtained last time from the SNSs targeted for obtainment. Records set by the user are stored in the SNS table 301. In the following description, it is assumed that tables including the SNS table 301 are stored in, for example, the RAM 103 and the storage device 104.

The post data 202 in FIG. 2 includes a posted image 203 and supplementary information 204. The posted image 203 is an image (image data) included in the post data 202. The supplementary information 204 is information that is supplementary to the post data 202, and for example, SNS information, date and time of posting, evaluation information, user information, and image information or the like. The SNS information is information that identifies one of the SNSs from which the post data 202 was obtained. The date and time of posting is information that identifies a date and time at which the post data 202 was posted on the SNS. The evaluation information is an evaluating for the post data 202 and is also an evaluation for the posted image 203. It is assumed that users who use the SNS use their terminals to leave a positive evaluation (e.g. good) or a negative evaluation (e.g. bad) for the post data 202. In the following description, an evaluation for the posted image 203 is an image evaluation. A numeric value of the image evaluation is an evaluation value for the post data 202 and the posted image 203. The numeric value of the image evaluation may be either the number of positive evaluations for the post data 202 or a combination of the number of positive evaluations and the number of accesses (the number of accesses to the post data 202). A calculation method to calculate the numeric value of the image evaluation may vary with SNSs. The user information is information that identifies a user who posted the post data 202. The image information on the posted image is information on the posted image 203.

The CPU 101 applies an image analysis process 205 to the posted image 203 included in the obtained post data 202 and generates a first parameter category 206 and first parameter information 207. The image analysis process 205 corresponds to a first image analysis unit. The first parameter category 206 is a category of the first parameter information 207. The category of the first parameter information 207 indicates the image analysis process 205 applied to the posted image 203. For example, the first parameter category 206 is "subject information" when "subject analysis" is applied as a first image analysis process, and "composition information" when "composition analysis" is applied as the first image analysis process.

The first parameter information 207 is an analysis result obtained by applying the image analysis process 205 to the posted image 203 and corresponds to a first parameter. A known image analysis process can be used as the image analysis process 205. For example, assume that a dog is in the posted image 203. By using the known subject analysis process to the posted image 203 as the image analysis process 205, the CPU 101 obtains "subject information" as the first parameter category 206 and subject information "dog" as the first parameter information 207. The CPU 101 may apply a plurality of image analysis process 205 to the posted image 203. In that case, the CPU 101 obtains a plurality of first parameter categories 206 and plural pieces of first parameter information 207. The image analysis process 205 may be an image analysis process that uses only partial data of the posted image 203 and the supplementary information 204. This holds for a second parameter category 211 and second parameter information 212.

The CPU 101 stores information on the applied image analysis process 205 in an analysis process table 401. The analysis process table 401 is a table in which information that identifies the image analysis process 205 applied to the posted image 203 is stored. FIG. 3B shows an example of the analysis process table 401. The analysis process table 401 has columns of analysis processes 402 and SNS names 403. The analysis processes 402 are names of image analysis processes applied as the image analysis method 205. The SNS names 403 are names that identify SNSs with the posted image 202 to which the used image analysis method 205 was applied. When an image analysis process is applied as the image analysis process 205, the CPU 101 adds a record 404 for the analysis process 402 and the SNS name 403. In the example shown in FIG. 3B, the record 404 showing that "subject analysis" was applied as the used image analysis process 205 for an SNS with the SNS name 403 "SNSA" is stored in the analysis process table 401. Also, the records 404 showing that "subject analysis" and "composition analysis" were applied as the used image analysis process 205 for an SNS with the SNS name 403 "SNSB" are stored in the analysis process table 401.

The CPU 101 stores the post data 202 obtained from the SNS 201, the first parameter category 206, and the first parameter information 207 in a post data table 208. Referring to FIG. 4A, a description will now be given of the post data table 208. A post data table 501 in FIG. 4A is the post data table 208 in FIG. 2. The CPU 101 associates first parameters and image evaluations 504 with each other and stores them in the post data table 208. The post data table 208 is a table stored in the RAM 103 or the storage device 104 which corresponds to a storage unit.

The post data table 501 in FIG. 4A has columns of posted images 502, dates and times of posting 503, image evaluations 504, posting users 505, and subject information 506. For each of the SNSs, the post data table 501 is individually managed in the RAM 103 or the storage device 104. The posted images 502 are data of the posted images 203. The date and time of posting 503 represent date and time at which the post data 202 including the post images 203 was posted. The image evaluations 504 are evaluation values for the post data 202 including the posted images 203. The posting users 505 are user identification information that identifies users who posted the post data 202 including the posted images 203 to an SNS. The column of the subject information 506 is information indicating the first parameter categories 206 in a case where subject analysis is applied as the image analysis process 205. In a case where the CPU 101 applies an analysis process other than subject analysis as the image analysis process 205, it adds a column indicating the applied analysis process. For example, when the CPU 101 applies composition analysis as the image analysis process 205 for the posted images 203, it adds a new column, which indicates that composition analysis is applied, to the post data table 501.

The CPU 101 adds records 507 to the post data table 501. For example, assume that the CPU 101 applies subject analysis as the image analysis process 205 for the posted image 203 (image 1) and obtains "dog" as the first parameter information 207. In this case, in the record 507 for the image 1, data of the subject information 506 indicating subject analysis is "dog". This data indicates the first parameter information 207. On the other hand, the subject information 506 indicates the first parameter category 206. When the CPU 101 applies a plurality of image analysis processes to the posted images 203, it adds a new column to the post data table 501. The CPU 101 sets a column name, which indicates the analysis process (the first parameter category 206) applied as the image analysis process 205, for the new column and stores the first parameter information 207 as data in the record 507. The post data table 501 may have a column of meta data (Exif information) on the posted images 203, a column of comments on the post data 202, and a column of the number of accesses to the post data 202.

As shown in FIG. 2, an image to be evaluated 209 is input to the image evaluation apparatus 100. As described above, the image input interface 108 receives input of the image to be evaluated 209 from the image input device 113. The image input device 113 is, for example, a camera or a scanner in which the image to be evaluated 209 is recorded. The image to be evaluated 209 may be an image selected by the user who operates the image evaluation apparatus 100, an image newly added to the image input device 113, or the like. There may be a plurality of images to be evaluated 209. When the image input interface 108 receives input of the image to be evaluated 209, the CPU 101 detects that the image to be evaluated 209 has been input. Upon detecting the input of the image to be evaluated 209, the CPU 101 applies the same image analysis process 210 as the image analysis process applied as the image analysis process 205 for the posted images 203 included in the post data 202 to the image to be evaluated 209. The image analysis process 210 corresponds to a second image analysis unit. By applying the image analysis process 210 to the image to be evaluated 209, the CPU 101 generates the second parameter category 211 and the second parameter information 212. The second parameter information 212 is an analysis result obtained by applying the image analysis process 210 to the image to be evaluated 209, and the second parameter category 211 is a category of the second parameter information 212.

As described above, there is the plurality of SNSs 201 on the Internet 114, and the image evaluation apparatus 100 is able to evaluate images posted on each of the SNSs 201. A target SNS (the SNS 201 on which the image to be evaluated 209 is to be posted) can be designated by the user with the pointing device 109 or the keyboard 110. A designation of the target SNS may be set in the image evaluation apparatus 100 in advance.

As described above, the image analysis process 205 applied to the posted images 203 included in the post data obtained from the SNS 202 is the same as the image analysis process 210 applied to the image to be evaluated 209. A plurality of image analysis processes 205 may be applied to the posted images 203 included in the post data 202. In this case, one or more of image analysis processes among the plurality of image analysis methods 205 which are applied to the posted images 203 may be applied as the image analysis process 210 to the image to be evaluated 209.

The CPU 101 extracts evaluation determination data 213 from the post data table 208 in accordance with the second parameter category 211 and conditions registered in an extracting condition table 601. The evaluation determination data 213 is represented as extracted data 213 in FIG. 2. Referring to FIG. 4B, a description will be given of the extracting condition table 601. The extracting condition table 601 stores conditions for data (records) to be extracted from the post data table 501. The extracting condition table 601 has columns of time periods 602 and target users 603. The time periods 602 represent time periods from which data is to be extracted. The target users 603 represent users who post data to be extracted among the posting users 505 of the post data table. Records 604 in the extracting condition table 601 are set by the user. For example, assume that the user has designated any of records in the extracting condition table 601 by means of the pointing device 109 or the keyboard 110. When the record has been designated, the CPU 101 recognizes conditions (the time period 602 and the target user 603) for extracting data (the records 507) from the post data table 501. For example, assume that the post data table 501 has the subject information 506 as a column corresponding to the second parameter category 211. In this case, the CPU 101 extracts data that satisfies the conditions of the time period 602 and the target user 603 from the post data table 501. The extracted data is the evaluation determination data 213 in FIG. 2.

The CPU 101 uses the extracted evaluation determination data 213 and a calculation table 701 to create a parameter evaluation value matrix 214. Referring to FIG. 5A, a description will be given of the calculation table 701. The calculation table 701 has columns of calculation timings 702 and calculation methods 703 for calculating parameter evaluating values which represent evaluating values of the second parameter information 212. The calculation timings 702 represent timing when the parameter evaluating values are calculated. The calculation methods 703 represent methods for calculating the parameter evaluating values. Records 704 in the calculation table 701 are set by the user. The example shown in FIG. 5A indicates that the calculation methods 703 are the average of or the evaluate of increase in image evaluations between calculation timings. By using the calculation timing 702 and the calculation method 703 for the designated record, the CPU 101 calculates parameter evaluating values from the evaluation determination data 213. Not only the average and the evaluate of increase but also any other arbitrary methods can be used as the calculation methods 703.

The CPU 101 stores the parameter evaluating values, which have been calculated from the evaluating determination data 213 by applying the designated calculation timing 702 and calculation method 703, in a parameter evaluation value matrix 801. FIG. 5B shows an example of the parameter evaluation value matrix 801 in a case where "every month" is designated as the calculation timing 702 and "average" is designated as the calculation method 703. In the parameter evaluation value matrix 801 shown in FIG. 5B, parameter evaluating values calculated at the respective calculation timings (every month) are stored for respective pieces of the second parameter information 212. There may be a case where the evaluation determination data 213 includes parameter evaluating values for respective pieces of a plurality of the first parameter information 207. Parameter information 802 (records) included in a column of "evaluation" in the parameter evaluation value matrix 801 represent the first parameter information 207 included in the evaluation determination data 213. In the example shown in FIG. 5B, "dog" and "car" are included as the first parameter information 207 in the parameter evaluation value matrix 801. Evaluation time periods 803 in the parameter evaluation value matrix 801 represent time periods between the designated calculation timings 702. Since "every month" is designated as the calculation timing 702 as mentioned above, the evaluation time periods 803 in FIG. 5B represent one-month time periods. For each piece of the first parameter information 207, the CPU 101 calculates averages of the parameter evaluating values for the respective one-month periods and stores them in the parameter evaluation value matrix 801.

Here, the evaluation determination data 213 is data that has a column corresponding to the second parameter category 211 of the post data table 208 (the post data table 501). The post data table 501 in the example shown in FIG. 4A has the column of the subject information 506. The subject information 506 corresponds to "subject" of the first parameter category 206. Since the first parameter category 211 is "subject", the parameter evaluation value matrix 801 in FIG. 5B is a parameter evaluation value matrix for the category "subject". As shown in FIG. 5B, the parameter evaluation value matrix 801 has a record 804 of parameter evaluating values with the parameter information 802 being "car", and a record 805 of parameter evaluating values with the "parameter information 802 being "dog". The records 804 and 805 indicate variations in image evaluations of the first parameter information 207 corresponding to the second parameter information 212 in chronological order. Namely, the records 804 and 805 indicate the progression of image evaluations of the first parameter information 207 corresponding to the second parameter information 212 (image evaluations changing over time). In a case where the parameter evaluating values are obtained by "monthly averaging", the parameter evaluating values represent the progression of the "monthly averaged" evaluations for the second parameter information 212 on the image to be evaluated 209.

Referring to FIG. 2, the CPU 101 identifies the parameter information 802 that matches the second parameter information 212 in the parameter evaluation value matrix 214. Then, the CPU 101 provides a notification of the latest parameter evaluating value among the parameter evaluating values of the identified parameter information 802 as a final evaluation result 215. For example, the CPU 101 may notify the input image device 113, to which the image to be evaluated 209 was input, of the final evaluation result 215. For example, when the image input device 113 is a camera with a screen, the final evaluation result 215 may be displayed on the screen of the camera. The CPU 101 may also display the final evaluation result 215 on the display 111 by controlling the display interface 106.

The CPU 101 may notify a plurality of parameter evaluating values for a predetermined time period among the obtained records. When, for example, the image input device 113 is notified of the plurality of parameter evaluation values for the predetermined time period, the image input device 113 can provide variations in the parameter evaluating values in chronological order. When the parameter evaluation value matrix 801 has a plurality of records, the CPU 101 may notify the parameter evaluation values as values relative to the other first parameter information 207. When the final evaluation result 215 is equal to or greater than a predetermined value, the CPU 101 acting as the posting unit may control the network interface 107 to automatically post an image to be evaluated to the target SNS 201 on the Internet 114. In the example described above, the process targets one SNS, but the same process is carried out for each of the plurality of SNSs.

Figure 6:
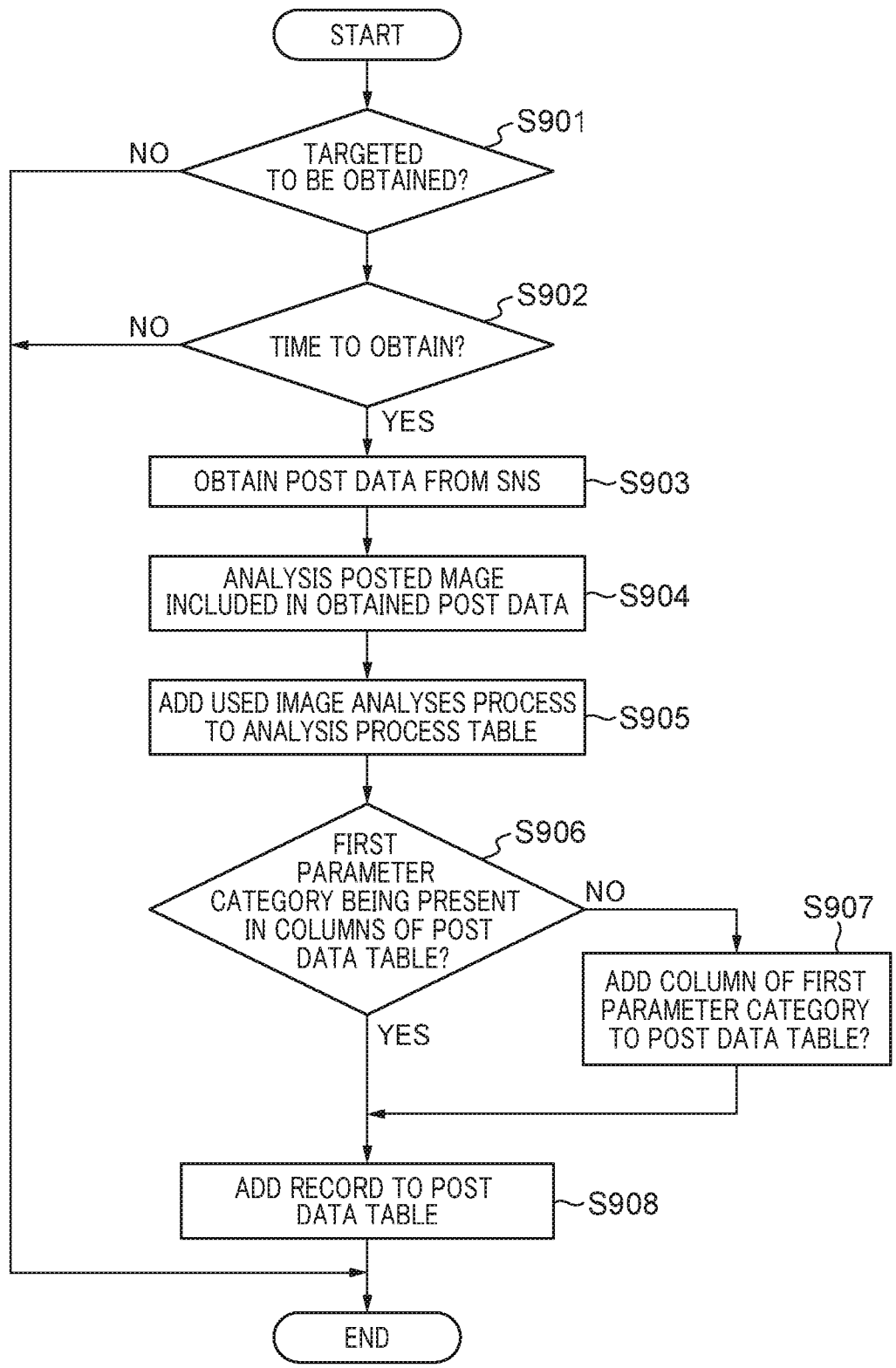
FIG. 6 is a flowchart showing the flow of a process in which an image analysis result is stored.

Next, referring to a flowchart in FIG. 6, a description will be given of a process in which an image analysis result is stored. Upon detecting start-up of the image evaluation apparatus 100, the CPU 101 refers to the SNS table 301, and for each of the records 306, the CPU 101 determines whether an SNS is a target for obtainment (step S901). In the example shown in FIG. 3A, the results of the determination in the step S901 are YES for the records 306 on SNSA and SNSB in the SNS table 301 because "YES" is shown in the column of the obtainment target. On the other hand, the result of the determination in the step S901 is NO for the record 306 on SNSC in the SNS table 301 because "NO" is shown in the column of the obtainment target. Thus, SNSC for which the result of the determination in the step S901 is NO is not a target for obtainment. Therefore, the image evaluation apparatus 100 ends the process without obtaining the post data 202 from SNSC.

For the records 306 for which the result of the determination in the step S901 is YES, the CPU 101 determiners whether the date and time at which the image evaluation apparatus 100 was started corresponds to the timing of obtainment (step S902). For example, assume that the date and time at which the image evaluation apparatus 100 was started is "Apr. 5, 2018". In the record 306 on SNSA in the SNS table 301, the obtainment timing 304 is "every day", and the date and time of last obtainment 305 is "Apr. 4, 2018". In this case, the date and time at which the image evaluation apparatus 100 was started satisfies the timing of obtainment in the record 306 on SNSA in the SNS table 301, and hence for the record 306 on SNSA, the result of the determination in the step S902 is YES. On the other hand, in the record 306 on SNSB, the obtainment timing 304 is "every week", and the date and time of last obtainment 305 is "Apr. 3, 2018". In this case, the date and time at which the image evaluation apparatus 100 was started does not satisfy the timing of obtainment in the record 306 on SNSB in the SNS table 301, and hence the result of the determination in the step S902 is NO for the record 306 on SNSB. For SNSB corresponding to the record 306 for which the result of the determination in the step S902 is NO, the process is ended because this is not the time to obtain data.

In the SNS table 301 in FIG. 3A, SNSA satisfies the conditions regarding the target to be obtained and the timing of obtainment, the result of the determination in the step S902 is YES. The CPU 101 obtains the post data 202 from the SNS corresponding to the record 306 for which the result of the determination in the step S902 is YES (step S903). On this occasion, the CPU 101 updates the date and time of last obtainment 305 in the SNS table 301. Of the post data 202 posted to the target SNS, the CPU 101 may obtain either the post data 202 updated from the previous one or the post data 202 for a predetermined time period that can be designated. The CPU 101 analyses the posted image 203 included in the obtained post data 202 by using the image analysis process 205 that is available (step S904). The first parameter category 206 and the first parameter information 207 are obtained as an analysis result. The CPU 101 adds the image analysis process 205 which it used, and an SNS name 302 which identifies the SNS from which the post data 202 targeted for analysis was obtained to the analysis process table 401 (step S905). For example, assume that the SNS 201 from which the post data 202 was obtained is SNSA, and subject analysis was applied as the image analysis process 205. In this case, the CPU 101 adds a record in which the analysis process 402 is "subject analysis" and the SNS name 403 is "SNSA" to the analysis process table 401. Also, assume that the SNS 201 from which the post data 202 was obtained is SNSB, and subject analysis and composition analysis were applied as the image analysis processes 205. In this case, the CPU 101 adds a record in which the analysis process 402 is "subject analysis" and the SNS name 403 is "SNSB" and a record in which the analysis process 402 is "composition analysis" and the SNS name 403 is "SNSB" to the analysis process table 401.

Then, the CPU 101 judges whether there is the first parameter category 206 in a column of the post data table 501 (step S906). For example, assuming that subject analysis and composition analysis were applied as the image analysis processes 205, the first parameter categories 206 are subject information and composition information. The post data table 501 in FIG. 4A has the column of the subject information 506, and this column corresponds to subject analysis. Therefore, for "subject" of the first parameter categories 206, the result of the determination in the step S906 is YES. On the other hand, the post data table 501 in FIG. 4A has no column for composition analysis. In this case, the result of the determination in the step S906 is NO, and the CPU 101 adds a column for composition analysis to the post data table 501 (step S907). For example, the CPU 101 adds a new column named composition information to the post data table 501. When the result of the determination in the step S906 is YES, the step S907 is not executed because there is no need to add a column to the post data table 501.

The CPU 101 adds the record 507 to the post data table 501 (step S908). The flow in FIG. 6 is then brought to an end. For example, the posted image 203 included in the post data 202 is stored as the image 1 in the record 507 in the first row of the post data table 501 in FIG. 4A. In the record 507, "Apr. 3, 2018" is stored as the date and time of posting 503 included in the supplementary information 204, "3" is stored as the image evaluation 504, and "user 1" is stored as the posting user 505. Also, in the record 507, "dog" is stored as the subject information 506 which is subject information obtained as the first parameter information 207. The record 507 is added to the post data table 501. The same holds for in the records 507 in the second and third rows of the post data table 501 in FIG. 4A.

Figure 7:
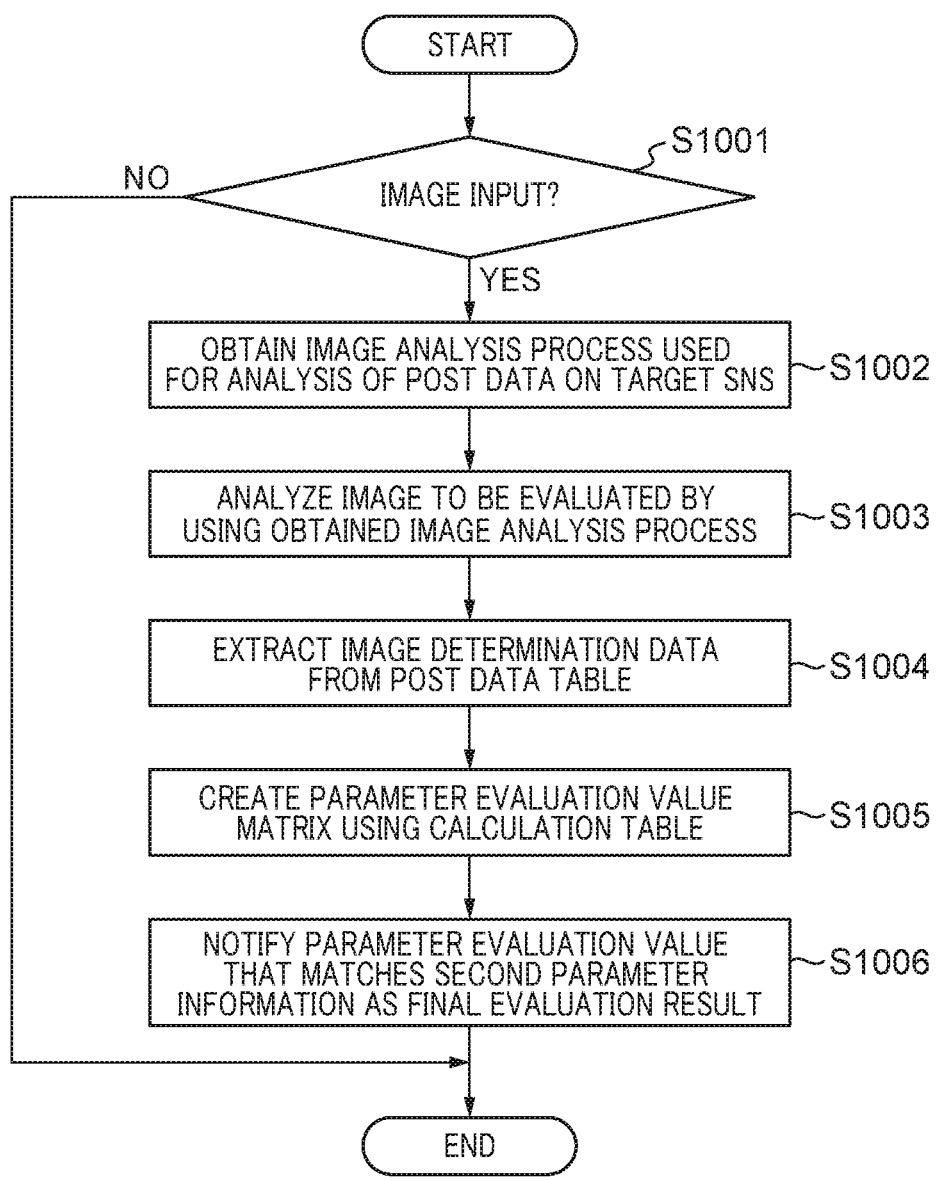
FIG. 7 is a flowchart showing the flow of a process which is carried out when input of an image to be evaluated has been detected.

Next, referring to a flowchart of FIG. 7, a description will be given of the flow of a process which is carried out when the CPU 101 has detected input of the image to be evaluated 209. The CPU 101 judges whether the image to be evaluated 209 has been input to the image evaluation apparatus 100 (step S1001). When the CPU 101 has not detected input of the image to be evaluated 209, the result of the determination in the step S1001 is NO, and the flow in FIG. 7 is brought to an end. When the CPU 101 has detected input of the image to be evaluated 209, the result of the determination in the step S1001 is YES. In this case, the CPU 101 refers to the analysis process table 401 to obtain an image analysis process applied to the target SNS (step S1002). As described above, the user who operates the image evaluation apparatus 100 is able to designate the SNS 201 (the target SNS), to which the image to be evaluated 209 is posted, by means of the pointing device 109 or the keyboard 110. A designation of the target SNS may be set in advance in the image evaluation apparatus 100. The CPU 101 refers to the analysis process table 401 to find which image analysis process 205 was applied to the post data 202 obtained from the target SNS designated or set in advance. For example, when the target SNS is SNSA, the analysis process 402 for which the SNS name 403 corresponds to SNSA in the analysis process table 401 in FIG. 3B is subject analysis. The CPU 101 obtains subject analysis as the image analysis process 205 applied to SNSA which is the target SNS.

The CPU 101 uses the image analysis process obtained in the step S1002 to perform an image analysis of the image to be evaluated 209 (step S1003). Namely, the CPU 101 applies the same image analysis process 210, which was applied to the posted image 203 included in the post data 202, to the image to be evaluated 209. Then, the second parameter category 211 and the second parameter information 212 for the image to be evaluated 209 are obtained as an image analysis result.

The CPU 101 extracts the evaluation determination data 213 satisfying conditions of the extracting condition table 601 and the second parameter category 211 from the data in the post data table 501 (step S1004). For example, assume that the date and time at which the image to be evaluated 209 was input is "Apr. 5, 2018", and the second parameter category 211 is "subject". Also, assume that the conditions that the time period 602 is "from one year ago till now", and the target user 603 is "all users" are selected. In the records 507 of the post data table 501 in FIG. 4A, the image 1 whose posting date and time 503 is "Apr. 3, 2018" and an image 2 whose posting date and time 503 is "Oct. 6, 2017" are data that satisfies the condition of the time period 602. The condition of the target user 603 is "all users", and the post data table 501 has subject information of the second parameter category 211. The image 1 and an image 2 (the records 507) satisfying the above conditions are extracted by the CPU 101 from the post data table 501 as the evaluation determination data 213. The extracting conditions (conditions such as the time period and the target user) may be set by the user.

The CPU 101 uses the calculation table 701 to create the parameter evaluation value matrix 801 based on the evaluation determination data 213 (step S1005). For example, when the second parameter category 211 is "subject", "dog" and "car" which are subject information of the evaluation determination data 213 are stored as the parameter information 802. When "every month" is set as the parameter evaluating calculation timing in the calculation table 701, the CPU 101 sets each of the evaluating time periods 803 to one month. When "average" is set as the calculation method 703 in the calculation table 701, the CPU 101 sets parameter evaluation values, which are average values of image evaluating for the respective months, in the records 804 and 805. For example, in the record 805, average values of image evaluating from "Mar. 6, 2018" to "Apr. 5, 2018" for parameter information whose subject information is "dog" are stored as parameter evaluation values. When "the rate of increase" is set as the calculation method 703, the CPU 101 may set "the rate of increase" for the respective months as parameter evaluation values in the records 804 and 805. The evaluating time periods 803 may be arbitrarily designated.

The CPU 101 notifies the parameter information 802 in the parameter evaluating matrix 801, which matches the second parameter information 212, as the final evaluating result 215 (step S1006). The CPU 101 may notify the latest parameter evaluation value among the parameter evaluation values of the parameter information 802 in the parameter evaluating matrix 801, which matches the second parameter information 212, as the final evaluating result 215. For example, when the second parameter information 212 is "dog", the parameter evaluation value in the latest evaluating time period 803 in the record 805 for "dog" is "4". The CPU 101 notifies "4" as the final evaluating result 215. For example, the CPU 101 may notify "4" as the final evaluating result 215 to the image input device 113 through the image input interface 108, and the image input device 113 may display the final evaluating result 215. Thus, notification of the latest image evaluation value of the SNS to which the image to be evaluated 209 is posted can be provided.

The CPU 101 may notify a plurality of parameter evaluation values in the evaluating time period 803 within a predetermined time period as the final evaluating result 215. For example, the CPU 101 may notify parameter evaluation values from "Dec. 5, 2017" to "Apr. 5, 2018" in the record 805 for "dog" in FIG. 5B. These parameter evaluation values represent variations in evaluating for the image to be evaluated 209 on the SNS to which the image to be evaluated 209 is posted in chronological order. In this case, by notifying the image input device 113 of those parameter evaluation values, the CPU 101 can provide the user with variations in evaluating of the image to be evaluated 209 on the SNS to which the image to be evaluated 209 is posted in chronological order. The CPU 101 may also notify latest parameter evaluation values in a plurality of records in the parameter evaluation value matrix 801 or parameter evaluation values within a predetermined time period in the parameter evaluation value matrix 801 as the final evaluating result 215. This provides the user with not only the image to be evaluated 209 but also evaluating of other types of images. For example, assume that the CPU 101 has provided notification of the record 805 for "dog" and the record 804 for "car" from "Dec. 5, 2017" to "Apr. 5, 2018". In this case, the user can be provided with variations in parameter evaluation values of not only the image to be evaluated 209 but also another type of image (i.e. an image of "car") in chronological order. By notifying the user of variations in parameter evaluation values in chronological order, the image evaluation apparatus 100 suggests how the evaluating for the image similar to the image to be evaluated 209 has changed on the target SNS. For example, the CPU 101 may notify changes in parameter evaluation values as a chronological graph.

The records 604 of the extracting condition table 601 in FIG. 4B described above can be set arbitrarily. For example, the user can set a specific user as the target user 603 in the extracting condition table 601. The specific user is, for example, an influencer. The influencer is an SNS user, and post data posted by the influencer tends to be viewed by many users. Namely, the influencer is a highly influential user on the target SNS. Since the number of viewers who view post data posted by the influencer tends to be large, there is a possibility that many positive evaluations are likely to be given to the post data. Thus, by setting the influencer as the target user 603 in the extracting condition table 601, the CPU 101 can notify parameter evaluation values for only the post data 202 posted by the influencer of the SNS on which the image to be evaluated 209 is posted.

Moreover, the image evaluation apparatus 100 may be a mobile terminal such as a smartphone. The smartphone has fewer hardware resources than a personal computer or the like, and hence a predetermined server (such as a cloud server) may bear a part of the functions described above. For example, the process in FIG. 6 is carried out by the predetermined server, and the predetermined server accumulates records of the post data table 501. In this case, the CPU 101 of the image evaluation apparatus 100 carries out the process in FIG. 7, and before executing the step S1003, requests the predetermined server to obtain information on the image analysis process 205 used for the target SNS and the records 507 of the post data table 501. This obtainment request is sent from the network interface 107 to the predetermined server on the Internet 114.

In response to the obtainment request, the predetermined server sends the information on the image analysis process 205 and each record 507 of the post data table 501 to the image evaluation apparatus 100 (smartphone) via the network interface 107 on the Internet 114. As a result, the CPU 101 obtains information needed to carry out the process in FIG. 7 and therefore is able to carry out the process in FIG. 7. In this case, a CPU of the predetermined server acts as the first obtainment unit, the first image analysis unit, and a control unit, and the CPU 101 of the image evaluation apparatus 100 acts as the second obtainment unit, the second image analysis unit, the extraction unit, and the calculation unit. In a case where the image evaluation apparatus 100 is, a smartphone with few hardware resources, it is unnecessary for the image evaluation apparatus 100 to hold, for example, the post data table 501. For this reason, a cloud server or the like bearing some processes in the present embodiment relaxes requirements for hardware resources needed for the image evaluation apparatus 100 and also accomplishes the object of the present invention. In this case, the image evaluation apparatus 100 may be equipped with functions of the image input device 113. For example, in a case where the image evaluation apparatus 100 is a smartphone with a camera, the image input device 113 acts as a camera. When a shot is taken with the camera, or when a predetermined operation is performed on the image evaluation apparatus 100 (such as a smartphone), the CPU 101 may carry out each of the processes described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129176, filed Jul. 6, 2018, which is hereby incorporated by reference herein in its entirety.

What is claimed is:

1. An image evaluation apparatus comprising:
an obtaining unit configured to obtain images included in post data posted on a networking service and evaluation values for the post data at predetermined time intervals;
a first image analysis unit configured to, upon obtaining the post data, generate first parameters by applying an image analysis process to the images;
a control unit configured to store the generated first parameters and the evaluation values in association with each other in a storage unit;
a second image analysis unit configured to, upon receiving input of an image to be evaluated, generate a second parameter by applying the image analysis process applied by the first image analysis unit to the image to be evaluated;
an extraction unit configured to extract a first parameter corresponding to the second parameter from the first parameters stored in the storage unit;
a calculation unit configured to calculate parameter evaluation values representing variations in evaluation values associated with the extracted first parameter in chronological order; and
a notification unit configured to notify the calculated parameter evaluation values.

2. The image evaluation apparatus according to claim 1, wherein the calculation unit calculates the parameter evaluation values by calculating an average or a rate of increase in the evaluation values associated with the extracted first parameter for respective predetermined periods and stores the calculated parameter evaluation values in chronological order.

3. The image evaluation apparatus according to claim 1, wherein the notification unit notifies a latest parameter evaluation value among the parameter evaluation values.

4. The image evaluation apparatus according to claim 1, wherein the notification unit notifies a plurality of parameter evaluation values for a predetermined time period.

5. The image evaluation apparatus according to claim 1, wherein the control unit stores categories of the first parameters and the first parameters in association with each other in the storage unit, and
the extraction unit extracts a first parameter in a category matching a category of the second parameter among the categories of the plurality of first parameters stored in the storage unit.

6. The image evaluation apparatus according to claim 1, wherein the control unit stores, for each of a plurality of the networking services, the first parameters and the evaluation values in association with each other in the storage unit.

7. The image evaluation apparatus according to claim 6, wherein upon receiving a designation of a networking service to which the image to be evaluated is posted, the second image analysis unit generates the second parameter by referring to the storage unit and applying the image analysis process, which the first image analysis unit applied to the images obtained from the networking service to which the images were posted, to the image to be evaluated.

8. The image evaluation apparatus according to claim 1, wherein:
the obtaining unit obtains user identification information that identifies users from the post data,
the control unit stores the first parameters and the user identification information in association with each other in the storage unit, and
the extraction unit extracts a first parameter associated with a designated user identification information from the first parameters stored in the storage unit.

9. The image evaluation apparatus according to claim 1, wherein a calculation method to calculate the parameter evaluation values representing variations in evaluation values in chronological order is allowed to be designated from a plurality of calculation methods.

10. The image evaluation apparatus according to claim 1, wherein timing that the obtaining unit obtains the images and the evaluation values is allowed to be set.

11. The image evaluation apparatus according to claim 1, further comprising:
a posting unit configured to post the image to be evaluated to the networking service in a case where the parameter evaluation values are equal to or greater than a predetermined value.

12. A system including a server and an image evaluation apparatus connected to the server via a network,
the server comprising:

a first obtaining unit configured to obtain images included in post data posted on a networking service and evaluation values for the post data at predetermined time intervals;

a first image analysis unit configured to, upon obtaining the post data, generate first parameters by applying an image analysis process to the images; and a control unit configured to store the generated first parameters and the evaluation values in association with each other in a storage unit;

the image evaluation apparatus comprising:

a second obtainment unit configured to obtain, from the server, information of the image analysis process applied to the first image analysis unit, the first parameters stored in the storage unit, and evaluation values associated with each first parameter stored in the storage unit;

a second image analysis unit configured to, upon receiving input of an image to be evaluated, generate a second parameter by applying the image analysis process applied by the first image analysis unit to the image to be evaluated;

an extraction unit configured to extract a first parameter corresponding to the second parameter from the first parameters stored in the storage unit;

a calculation unit configured to calculate parameter evaluation values representing variations in evaluation values associated with the extracted first parameter in chronological order; and a notification unit configured to notify the calculated parameter evaluation values.

13. A control method for an image evaluation apparatus, comprising:

obtaining images included in post data posted on a networking service and evaluation values for the post data at predetermined time intervals;

generating, upon obtaining the post data, first parameters by applying an image analysis process to the images;

storing the generated first parameters and the evaluation values in association with each other in a storage unit;

generating, upon receiving input of an image to be evaluated, a second parameter by applying the image analysis process applied by the first image analysis unit to the image to be evaluated;

extracting a first parameter corresponding to the second parameter from the first parameters stored in the storage unit;

calculating parameter evaluation values representing variations in evaluation values associated with the extracted first parameter in chronological order; and notifying the calculated parameter evaluation values.

14. A non-transitory computer-readable storage medium storing a program that causes a computer to execute a control method for an image evaluation apparatus, the control method for the image evaluating apparatus comprising: obtaining images included in post data posted on a networking service and evaluation values for the post data at predetermined time intervals;

generating, upon obtaining the post data, first parameters by applying an image analysis process to the images;

storing the generated first parameters and the evaluation values in association with each other in a storage unit;

generating, upon receiving input of an image to be evaluated, a second parameter by applying the image analysis process applied by the first image analysis unit to the image to be evaluated;

extracting a first parameter corresponding to the second parameter from the first parameters stored in the storage unit;

calculating parameter evaluation values representing variations in evaluation values associated with the extracted first parameter in chronological order; and notifying the calculated parameter evaluation values.

* * * * *